April 11, 1972     H. C. MORTON ET AL     3,655,603

RESIN IMPREGNATED FIBROUS MATERIAL HAVING LOW FRICTION

Filed Dec. 26, 1969

WITNESS:
Esther N. Stockton

INVENTOR.
Henry Clifford Morton
Thomas J. Rasmussen
BY
W. G. Thompson
ATTORNEY

United States Patent Office 3,655,603
Patented Apr. 11, 1972

3,655,603
RESIN IMPREGNATED FIBROUS MATERIAL HAVING LOW FRICTION
Henry Clifford Morton, East Greenbush, and Thomas J. Rasmussen, Schenectady, N.Y., assignors to The Bendix Corporation
Continuation-in-part of application Ser. No. 577,297, Sept. 6, 1966. This application Dec. 26, 1969, Ser. No. 888,547
Int. Cl. C08g 51/24
U.S. Cl. 260—29.3
8 Claims

ABSTRACT OF THE DISCLOSURE

A bearing material having a resin impregnated matrix is disclosed herein. The resin is a reaction product of a homogeneous distribution of tetrafluoroethylene particles and a sulfomethylated phenolic resin which is subsequently polymerized after having impregnated a suitable matrix material and been formed into the desired shape.

CROSS REFERENCE TO RELATED APPLICATIONS

This is a continuation-in-part of Ser. No. 557,297, filed Sept. 6, 1966, now abandoned.

SUMMARY OF THE INVENTION

The present invention relates to a moldable bearing material and various shaped bearings or articles made therefrom, and more particularly, a bearing material having a binder formed of a collodial dispersion of phenolic resin and tetrafluoroethylene (Teflon) resin blended in proportions, producing high load support capability in the bearing material.

Due to the poor cold flow characteristic of tetrafluoroethylene, prior use of this material with resin systems has generally been confined to thin coats applied to a load bearing substrate material. These prior coatings, whether the tetrafluoroethylene was a dispersion, woven mat or other form, were subject to breakdown after a period of use wherein a mating part wore through the thin coating, requiring replacement of the bearing, if removable, or entire functional article, if not removable. Moreover, the processing costs of such prior coated materials were high and usually required the higher cost woven fabric or string forms of the tetrafluoroethylene to produce a satisfactory coating or laminates of even limited life.

It is an object of the present invention to provide an improved bearing material having a phenolic resin-tetrafluoroethylene binder having high load capability, for example, sufficient to withstand directly loadings associated with vehicle ball joint suspensions while preventing cold flow of the tetrafluoroethylene content.

It is another object of the present invention to provide an improved tetrafluoroethylene containing bearing article of lower cost and having much longer service life than prior bearing articles of similar load capability.

Figure 1:
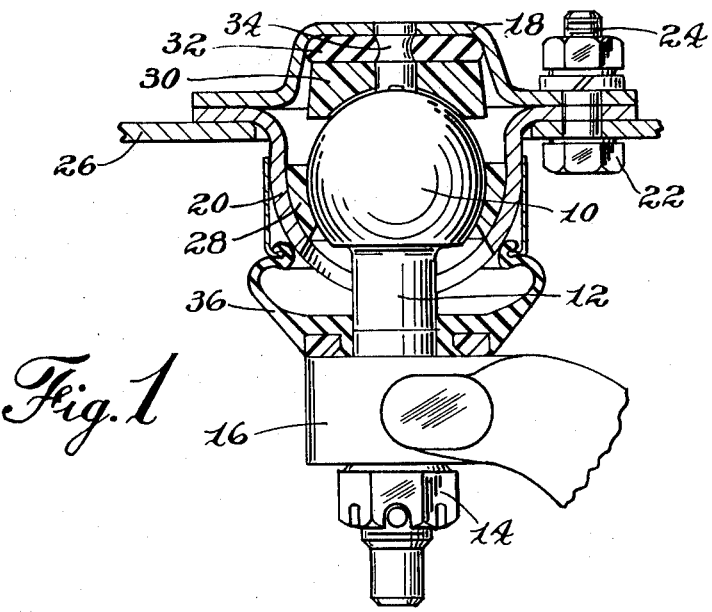
Figure 2:
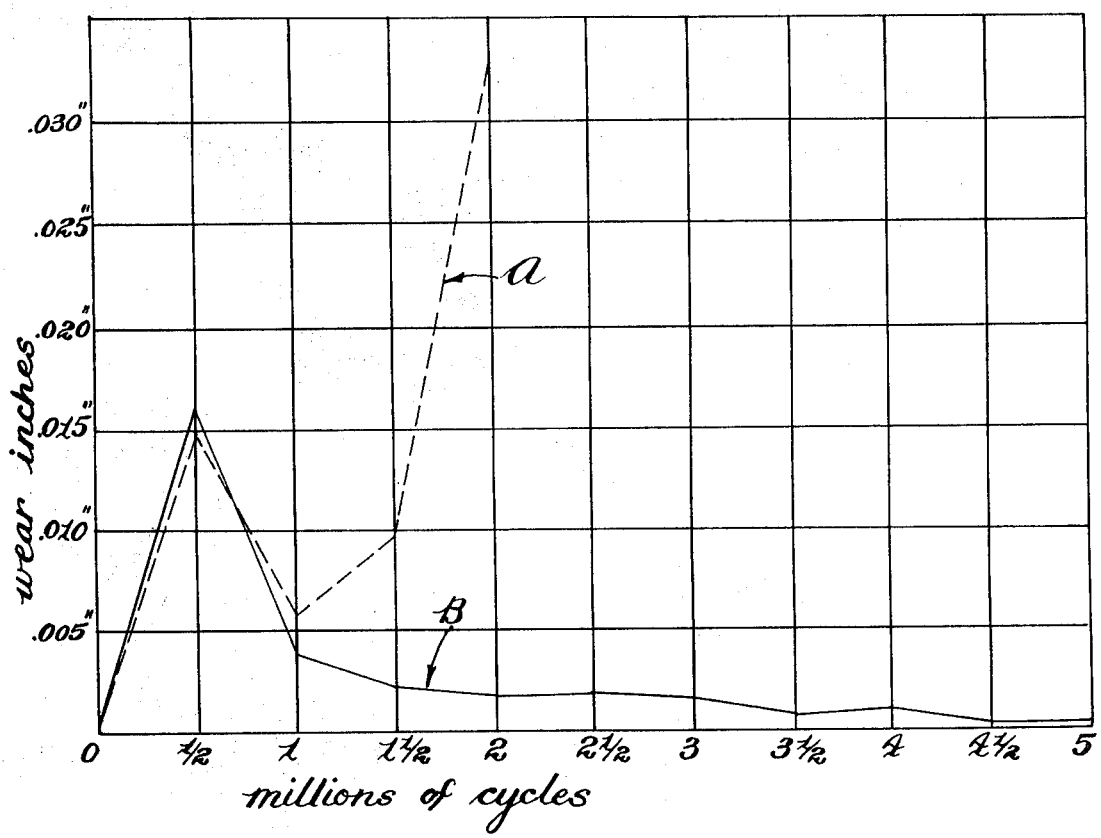

Other objects and advantages will become apparent on consideration of the accompanying description and drawing wherein:

FIG. 1 illustrates a typical application of the present invention applied to a ball joint suspension system; and FIG. 2 is a graph showing wear characteristics of our friction material compared to prior art laminates now in use.

DETAILED DESCRIPTION

Referring to FIG. 1, there is shown a typical application of our friction material in a ball joint suspension system, for example, of the well-known automotive type. The ball joint system basically consists of an integral ball 10 and stud 12 attached by nut 14 to steering knuckle 16. The ball 10 is received in a socket comprised of upper plate member 18 and lower plate member 20 which are clamped together by bolt 22 and nut 24. The socket assembly is connected to control arm 26, shown fragmentarily. Within the socket is a first molded piece of our improved friction material 28 of ring shape abutting ball 10. A second piece of molded friction material 30 is generally of disc shape and conforms to the top surface of ball 10. A rubber cushion 32, which may or may not be required, depending on the application and shock loading to be encountered, is intermediate plate 18 and molded piece 30 and attached along with piece 30 by rivet 34. The ball joint system is completed by dust seal 36.

Molded pieces 28 and 30 are comprised of our improved friction material and are capable of extremely long service life in this and similar loading situations so that, for the most part, service replacement which is now common may be virtually eliminated.

Friction molded pieces 28 and 30 are comprised of a new and novel phenolic resin-tetrafluoroethylene resin binder and, depending on application, other additives to enhance certain characteristics as will be later described. The binder is made from a mixture of from 30% to 45% by weight tetrafluoroethylene resin and the balance a water soluble phenolic or phenol aldehyde resin. The tetrafluoroethylene resin is in the form of a latex or colloidal dispersion of tetrafluoroethylene particles of 0.05 to 0.5 micron diameter suspended in an aqueous solution. Various strength latex solutions are commercially available and sold under the trademark "Teflon" ranging from solutions having 35% to 60% solids of tetrafluoroethylene in solution and may be used in the practice of this invention. The percentage range of 30% to 45% by weight of tetrafluoroethylene resin compared to phenolic resin necessary for the practice of this invention is based on a comparison of tetrafluoroethylene solids compared to the dry solids content of water soluble phenolic resins which may also be in an aqueous solution. The form of tetrafluoroethylene resin as available in the latex form is of importance to the practice of the instant invention since it permits the uniform mixing of particles of tetrafluoroethylene. Furthermore, the tetrafluoroethylene particles are capable of impregnating a suitable matrix material to provide longer life and to prevent "burn-out" associated with thin coatings of tetrafluoroethylene.

The proportions of tetrafluoroethylene resin to phenolic resin we have found to be of high importance in this example since above these limits, the material does not have sufficient load capability and below this limit, high friction will generate heat, causing burn out. Within these limits, load capability is sufficiently high to permit the material to be used directly as a load-supporting member with low enough friction so that a homogeneous mass of the material may also be used directly as a friction material. Having achieved this, freedom from the laminated approach is obtained. This is not to be interpreted as precluding the use of our material in laminate form of preferably generous proportions, but merely to emphasize that in whatever form used, the material has both low friction and high load capability which allows one to get away from the concept of a very thin film of high tetrafluoroethylene content which has poor cold flow properties under load which cause it to break down after a short period of use.

The significance of obtaining a homogeneous mass of material having both high load and low friction properties compared to a laminate having a load-bearing substrate material onto which a thin film of low friction tetrafluoroethylene is applied is best illustrated by the curves in FIG. 2.

A test was conducted by mounting a ball joint such as that illustrated in FIG. 1 having a 1¼" ball in a test dynamometer. Standard prior art laminated friction material which was an original standard part of the ball joint assembly was first left in for comparison purposes. A 2,000 lb. load was applied by means of an air cylinder. The ball and stud were connected to a crankshaft in the test unit which through the use of an eccentric cam, oscillated the ball and stud 30° right and left from a center line for 60° (degrees) total movement. The test unit operated at an oscillation rate of 21,000 cycles per hour and was equipped with a counter to record total cycles. Wear readings were taken by micrometer each half-million cycles (which measured combined wear and deformation effects) which, when plotted, produce curve A of FIG. 2.

The above test was repeated, replacing the prior art material with the friction material in accordance with the teachings of this invention. The results obtained by this second test have been plotted as curve B of FIG. 2.

Over the first one million cycles, the prior art material and the material of the present invention performed substantially the same. This may be termed a break-in phase where wear is initially high until the mating part, ball 10, becomes coated with tetrafluoroethylene, causing a sharp reduction in fraction and hence, wear. The prior art material had slightly less wear at the half-million cycle point which is believed attributable to a higher content and a more freely available form of tetrafluoroethylene. The behavior of the materials for one million cycles and more was drastically different. After obtaining an optimum at one million cycles, the wear, or deformation, due to cold flow of the prior art material again sharply increased and completely failed at two million cycles. It will be appreciated that doubling or tripling the film thickness would not be a satisfactory answer to this probelm since susceptibility to cold flow deformation would also increase.

With the material of the present invention and after an initial break-in phase, fraction and/or deformation actually improves over each increment of life and asymptotically approaches zero. With this degenerative wear or deformation pattern, a designer by computing thickness may essentially provide indefinite life so that sealed units may be built which are intended to require no service or replacement over the life of the system in which it is installed. For example, the total wear for five million cycles of the material of this invention was 0.0245". It can be appreciated that if an initial thickness of ¼" were provided, approximately .2205" is left after five million cycles with wear averaging less than .0005" per million cycles and becoming progressively less. It becomes a simple matter to out-design the expected life of the balance of the system by an ample margin.

The use of a water slouble heat reactive phenolic or phenol aldheyde resin provides a resin which is readily combinable with a latex form of tetrafluoroethylene resin to intimately intermix and lock in the tetrafluoroethylene to resist its cold flow tendency. A full description of a water soluble resin of the sulfomethylated type, suitable for practice in the present invention, may be found in U.S. Pat. 2,357,798, bearing in mind other suitable resins are now commercially available.

Various additives may be used to facilitate processing or for special effects. In one example, I have prepared a mixture of 40% tetrafluoroethylene resin with a 60% of a water soluble sulfomethylated resin of the one state heat reactive thermosetting cure type. These percentages are based on weight percentages of the solids content of resins in an aqueous solution. This mixture was impregnated in cotton cloth and partially cured. The impregnated cotton cloth was then shredded, diced or otherwise sheared to provide small pieces which could be easily handled by processing equipment to fill any desired mold or shape. A mold was then filled with these pieces and heat and pressure applied to obtain final cure of a homogeneous article of desired shape. The cotton duck not only facilitates handling, but also provides some resiliency to the end article, increasing its ability to withstand shock loads. Other fibrous or absorbent material may be used for the matrix, such as asbestos, linen, Orlon (acrylic fiber), Dacron (polyethylene terephthalate), ramie, jute, sisal or the like prepared in yarn, string, or woven material form.

Additions of low friction metal oxides have been found to reduce wear during the break-in period. In a second example, 5% cadmium oxide, CdO, was added, reducing break-in friction.

Such non-oxides as $CdI_2$ appear to have a catalytic action, inducing more rapid build-up of tetrafluoroethylene on a mating ball. Ten percent $CdI_2$ has been added in a third example to foreshorten the break-in period.

In a second example, a bearing according to the present invention was prepared for a piston ring in an application wherein a slight lubricating action was obtained from residual fluid clinging to the walls of the cylinder. Accordingly, the potential for bearing burn-out was reduced and a lower percentage of tetrafluoroethylene resin was required. It is believed that the practical lower limit for tetrafluoroethylene resin as compared to total solids is about 15%. Below this value, it is felt that the contribution of the tetrafluoroethylene would be negligible. In this example, the bearing material is prepared by saturating, or impregnating, a suitable matrix, in this instance paper or fabric. Subsequent removal of water solvent from the system through a controlled heat treatment leaves the saturated fabrics in a reactive state suitable for conversion into useful, molded articles containing Teflon to form low friction surfaces.

In saturating paper or fabrics we prefer to use a resin of the sulfomethylated phenol-formaldehyde type which has been modified with 10–30 mol percent of cashew nut shell oil on the basis of the phenol content. The sulfomethylation of the phenol formaldehyde makes possible the cashew nut shell oil modification without loss of water solubility of the resin. The cashew nut shell oil enters into the reaction and functions as a heat resistant plasticizer which provides the elasticity essential in post forming operations of the partially cured phenolic resin-Teflon saturated base stock.

In a specific example, a pure cellulosic paper of the type used in air filters is passed through a solution comprised as follows:

| | Percent solids |
|---|---|
| Dupont Teflon #30 Latex | 20 |
| Sulfomethylated phenolic cashew modified resin | 80 |

The saturated paper is then passed through an oven at 160° F. to remove the water and to convert the resin to the B stage. At this point, the treated paper may be used in flat length to form a laminated structure or it may be chopped or mascerated for use as a molding powder for use in compression, injection or transfer molding processes.

In our specific example 17 plies of treated paper are hot pressed for 5 minutes at 300° F., 1500 p.s.i., to form a dense sheet. Upon removal from the press the sheet is immediately chilled to room temperature to prevent the resin-Teflon binder from becoming converted to a thermoset state. The flat sheet is then sawed into strips as desired and ground to the required thickness. The strips are then reheated at 300° F. and low pressures for 1 minute between press platens. Upon removal from the press the flat strips are formed into a full circle and chilled to room temperature. The rings are then placed upon suitable mandrels and baked for 1 hour at 350° F. to fully convert the resin to its thermoset stage thus forming a fully molded ring suitable for use as a ⅛" thick piston ring containing 20 percent of Teflon cured in situ.

We claim:

1. A low friction bearing material comprising a polymerized resin impregnated fibrous matrix material wherein said resin impregnate comprises:

the reaction product of a mixture of thermosetting sulfomethylated phenol-formaldehyde resin and a tetrafluoroethylene latex having a colloidal dispersion of of tetrafluoroethylene resins content wherein 20% to 60% weight tetrafluoroethylene particles of between .05 and 0.5 microns diameter are suspended in an aqueous solution, said tetrafluoroethylene resin content comprising of from about 15% by weight to about 45% by weight of the total solids of said phenolic and tetrafluoroethylene resins.

2. The bearing as claimed in claim 1 wherein said tetrafluoroethylene remains colloidally dispersed after polymerization.

3. The bearing as claimed in claim 1 wherein said tetrafluoroethylene resin content comprises more than about 30% by weight of the total solids of said phenol-formaldehyde and tetrafluoroethylene resins.

4. The method of preparing a bearing material comprising the steps of:

mixing a thermosetting sulfomethylated phenol-formaldehyde resin with a tetrafluoroethylene resin in an aqueous solution, said tetrafluoroethylene resin content comprising of from about 15% by weight to about 45% by weight of the total solids of said phenolic and tetrafluoroethylene resins;

impregnating a matrix material of pieces of fibrous material;

shaping the impregnating matrix; and curing the mixture impregnated matrix.

5. The method recited in claim 1 wherein said matrix material is selected from the group consisting of cotton duck, asbestos, linen, acrylic, polyethylene terephthalate, ramie, jute, or sisal.

6. The method recited in claim 4 wherein said matrix material is selected from the group consisting of cotton duck, asbestos, linen, acrylic, polyethylene terephthalate, ramie, jute, or sisal.

7. The method as recited in claim 6 wherein said matrix is shaped by pressing the mixture for five minutes at 300° F. at 1500 p.s.i.

8. The method as recited in claim 7 wherein said matrix is cured by heating said mixture for one hour at 350° F.

References Cited
UNITED STATES PATENTS

| | | | |
|---|---|---|---|
| 2,825,706 | 3/1958 | Sanders | 260—29.3 |
| 2,976,257 | 3/1961 | Dawe et al. | 260—29.3 |
| 3,322,710 | 5/1967 | McWhorter et al. | 260—29.3 |
| 2,639,274 | 5/1953 | Salathiel | 260—29.3 |

DONALD J. ARNOLD, Primary Examiner

U.S. Cl. X.R.

260—29.6 F, 37, 38